UNITED STATES PATENT OFFICE.

CORNELIUS MASSACIŬ, OF BERLIN-TEMPELHOF, AND AUGUST NEUMANN, OF REPPEN, GERMANY.

SOFTENING AND PURIFYING WATER.

1,202,557.  Specification of Letters Patent.  Patented Oct. 24, 1916.

No Drawing. Continuation in part of application Serial No. 593,076, filed November 18, 1910. This application filed August 31, 1915. Serial No. 48,239.

*To all whom it may concern:*

Be it known that we, CORNELIUS MASSACIŬ and AUGUST NEUMANN, citizens of the German Empire, residing, respectively, at Berlin-Tempelhof, Germany, and Reppen, Germany, have invented certain new and useful Improvements in Softening and Purifying Water, of which the following is a specification.

The invention relates to softening and purifying water; and it comprises a method of softening and purifying water with the aid of pervious textured hydrated rocky or stony materials of igneous origin wherein a bed or layer of such material in granulated form is alternately treated with water to be purified and with chemical substances adapted to revive its activity for the treatment of water, as in filtering a water to be softened through such material until the material takes up lime and magnesia and then removing the lime and magnesia with a solution of salt (NaCl); all as more fully hereinafter set forth and as claimed.

The former processes of softening water by direct precipitation of dissolved magnesia, lime, iron and the like, by the addition of bases with subsequent sedimentation and filtration are rapidly giving way to a simpler process of removing the dissolved solids by a double exchange; by the use of an "exchange silicate" or "artificial zeolite." It has been found that by fusing certain bases with silica in certain proportions (see Gans 943,535) a material can be obtained which upon hydration possesses this exchange property; when used as a filter bed it will give up sodium compounds to water going therethrough and take up lime and magnesia in its lieu. When exhausted, the material may be revivified with a solution of common salt, to which it now gives up calcium and magnesium, taking sodium in their lieu. This method is not only applicable to the softening of water by removing magnesia and lime, but by certain variations it is made applicable to the removal of various other materials (potassium, manganese, iron, copper, lead, etc.) from water or aqueous solutions containing the same. In principle, the process rests upon the fact that these exchange silicates will exchange one base for another. In softening water, they give up sodium for lime and magnesia; while after they are charged with lime and magnesia, the sodium can be replaced and the lime and magnesia removed by treatment with sodium chlorid solution, rendering the material ready for reuse. These silicates also have strong adsorptive powers, whereby they are able to take up precipitated active materials, such as the higher non-basic manganese oxids and with the use of such active materials, many other reactions can be accomplished. Among these reactions are oxidation reactions by which manganese and iron can be removed from water.

The zeolites or exchange silicates whose functions have just been described are artificially made materials of a certain rather definite composition, containing alumina, silica, an alkali and water of constitution. We have however found that like results may be obtained by the employment of certain natural materials; these being used either as they occur or after a simple and inexpensive treatment.

We have ascertained that rocky or stony material having a glassy or porphyritic texture, such as phonolite, porphyry and trachyte or their tuffs (viz. porous volcanic rock), trass, etc., are suitable for the purification of water by filtration, either directly, in case they have already been hydrated by processes of nature, or after they have been artificially hydrated to advance their activity. The hydration for advancement in activity of the said stones or rocks may be effected by treatment with steam under pressure, or by the joint action of steam under pressure and alkaline materials, such as alkalis, earthy-alkalis, alkali carbonates, and alkali silicates, in which case the said treatment may be followed by a supplemental treatment with neutral alkali-salts, in order to impart to the stones or rock more decidedly the zeolitic character. The material obtained as described may, if containing sodium, be utilized for softening water, and if containing lime, it may be used in conjunction with one of the higher oxids of manganese for removing iron or manganese from water. In studying these materials, we have found that the active properties of suitable volcanic rocks are mainly due to the glassy or vitreous constituents of the same; that is, to the material which has not solidified into distinctly crystalline form while the crystalline materials formed or developed in the originally liquid volcanic magma, such as feldspar, sanidine, or augite, do not possess this capacity of exchange, or only to a small extent. Research has shown that even in the same kind of rock the power of exchange may be subject to fluctuation, which may be attributed to special constitution or a special structional condition. Such a glassy rock in a fresh condition may appear transparent, clear and colorless, but on closer microscopic examination it usually shows spots which have been subjected to change or decay, appearing turbid, and having an uneven structure. These spots do not affect polarized light and can therefore be described as of amorphous texture. On treating polished surfaces of these rocky or stony materials with solutions of certain dyes, such as methylene blue, they show a remarkable contrast in their structure or texture. In those places where atmospheric decay has taken place high porosity is evinced and the rock becomes tinted. These portions or parts are pervious and allow the dye to penetrate. It is material of this pervious character, that is, material which tints readily with methylene blue and similar anilin dyes, which is particularly useful in this invention. As stated, these active portions of the rock appear to be due to atmospheric decay. The same character of decay or change with heightened reactivity can be quickly produced by artificial means by heating with water under pressure or steaming under pressure. In treatment with water, the presence of alkaline substances, such as the hydroxid of the alkaline earths or alkalis, alkali metal carbonates, alkali metal silicates, or even neutral alkali salts, is advantageous. The addition of alkali metal compounds, such as caustic alkalis or carbonates of alkalis, is particularly useful when the original material is deficient in sodium or potassium. During or after hydration neutral alkali salts may be added in order to avoid a slimy or gelatinous condition of the product.

We have found that even with rocky or stony materials which are naturally adapted for the present purposes the capacity for exchange may be substantially increased by artificial hydration. This method of treating igneous rocks for the purpose of preparing or improving exchange materials we do not however claim herein, it forming the subject matter of our copending application 766,657, filed May 9, 1913. The present application relates to the employment of these materials, with or without such a treatment, in the purification of water by a method wherein water is first purified, the material is revivified and is then reused for purification, this alternation continuing indefinitely long.

As stated, very many rocks and stony materials of igneous origin may be used, with or without treatment. The physical and chemical composition of these materials varies between wide limits. They consist of varying mixtures of amorphous material and crystalline bodies, and the chemical composition of the amorphous matter varies. The components of the amorphous particles cannot generally be determined definitely and especially not in the fragmental rocks. But it has been found that those materials with comparatively large amounts of glassy portions, attackable by hydrochloric acid, can be used very successfully.

It is not possible to give a formula for the chemical composition of these glassy materials, since like all glasses, they cannot be considered as simple chemical compounds but are mixtures of different components in variable portions. The elements which should be present are silicon, aluminum and alkali metals or alkaline earth metals. Other elements, especially iron or other heavy materials, such as manganese, etc., are also often present. Glassy material is often found as a principal component in many porphyries and also as a cementing body in various tuffs. Trass, for instance, contains large quantities of very suitable glassy material. What the other components are in the fragmental rocks, whether light colored fragments (trachyte) or dark colored fragments (basalt), or whether both together are present, makes little difference. They have not been found of influence in these processes. And when present they are simply, so to speak, diluents in the material to be used.

In regard to the chemical composition, it has been found that those materials containing besides silica and alumina rather high amounts of alkali metals can be used directly for softening water if they be hydrated and porous; while for removing iron, etc., material containing alkaline earth compounds such as lime can be used. Conclusions as to the chemical composition of the material can be made in a simple manner by determination of the small crystals which can be observed in all natural glassy material. The presence of crystals of leucite or sodalite or nephelin or mica or alkali-feldspar, (the latter a characteristic of light colored porphyries or trachytes) or of alkali-feldspar and feldspathoids together (characteristic of phonolite) in the rocks is desirable, as an indication of high amounts of alkali metals.

The usefulness of the material is in proportion to the fineness of its pores. A perviousness such that pores are only visible under the microscope after coloring the material is desired. Methylene blue or any other suitable dyestuff may be used for testing. In general phenolphthalein can be used in testing, producing a slight pink tint if the material is basic and contains high amounts of alkaline metals. Uncolored spots show the places which are not pervious. The fine porous material always contains water of hydration, i. e., water which cannot be driven out at 105° C. This water of hydration is essential. The material loses its exchange property if any substantial amount of this water is driven out by heating to high temperatures. With the loss of water of constitution go physical and chemical changes in the material which rob it concomitantly of activity; and once lost it is difficult to reintroduce this water of hydration. Where these rocky or stony materials occur in the earth or elsewhere where they are permanently wet or moist, they have generally been converted by the lixiviating action of ground water into a suitable porous and hydrated condition, some constituents having been dissolved out and removed and others changed by the water into hydrated materials. Where the amorphous constituents of the natural material are not porous and do not contain water after being dried at a temperature of 105° C., they can be artificially hydrated. Where they contain sodium or where sodium has been added by the treatment described, they may be used for softening water by filtering the water therethrough. After taking up a substantial amount of lime and magnesia they may then be revivified by a treatment with a salt solution. Materials of a suitable character containing lime in lieu of sodium may be used in conjunction with one of the higher oxids of manganese for removing iron and manganese from water (see Gans 951,641).

If a part or all of the alkali metal is replaced in the natural material by alkaline earth metals, the conversion into material containing alkali metal bases is possible by the same process as is used for regeneration, i. e., by treating the natural material with neutral alkali metal salt solutions such as a solution of sodium chlorid.

The material is advantageously used in layers or beds analogous to those employed in artificial filtration processes. Granules of 0.5 to 2 mm. size may be obtained by crushing. The finer material and the dust from crushing as well as the fine mud which always occurs in the cavities of the rocks may be removed by screening or washing. Artificial hydration and alkalization, when necessary, may be performed on the granulated material.

In a specific embodiment of the present process of softening water, we may take trachyte of a pervious character (indicated by treatment with methylene blue), crush and size it and filter hard water through it. It will be found to take up the lime and magnesia in much the same way as the exchange silicates or artificial zeolites, giving up sodium in their lieu. After adsorption of lime and magnesia slackens, we then treat the material with a solution of sodium chlorid, wash out the excess of sodium chlorid and then reuse the revivified material for softening water. After use in purifying water the bed or layer is next "back washed"; i. e., treated with a strong current of water in the reverse direction to carry off impurities collected by the filtering action of the bed and to rearrange the granules. In regeneration or revivification by salt solution the flow is best downward through the bed as this renders washing out residual solution easier.

In the event that the material to be used is not naturally pervious and hydrated (as indicated by the treatment with methylene blue) it may be subjected to the action of heated water under pressure until the pervious character is obtained. Where the material does not contain sodium and is to be used for softening water, a sodium salt, such as sodium carbonate or sodium hydrate, may be added to the water used in this heat treatment. Or after hydration with water in the case of rocky material containing much lime the steamed or heated material may be treated with salt solution in the manner adopted in revivifying.

The mechanically resistant, hard and strong nature of these rocky materials makes them particularly adapted to the present method of purifying water since the granules do not tend to erode, slime down or give mud; a filter bed retaining its pervious character for a long time. Where the material contains replaceable lime or calcium compounds it may be used for removing and recovering potash from various solutions containing the same; as for example beet molasses or osmose water. For example, osmose water may be sent over the material until potash is taken up in exchange for lime. The material may then be regenerated with a solution of calcium chlorid to which it will give up its potash. If the original material is not rich in lime it may be made so by a treatment with calcium chlorid solution.

Where the original material contains oxidizable bases, such as iron and manganese, it may be treated with a solution of permanganate of potassium, with chlorin solution, bleaching powder, ozone, etc., to peroxidize such compounds. Or the material may be enriched with manganese by direct treatment with manganese chlorid, or permanganate solution. The material takes up compounds corresponding to MnO by base exchange in the usual manner, but the MnO is susceptible of further oxidation. And when so oxidized it may be used for removing iron and manganese from water, as it oxidizes both forming insoluble oxids. Oxids so removed from water can be displaced mechanically by the back washing operation described. After the oxidizing power of such a filter bed is exhausted it may be revived, as stated, with permanganate, bleaching powder, etc.

What we claim is:—

1. The process of removing dissolved impurities from water which comprises filtering such water through minutely pervious amorphous material of igneous origin and containing water of hydration until such dissolved impurities are abstracted from such water by such material.

2. The process of removing dissolved lime compounds from water which comprises filtering such water through a minutely pervious amorphous material of igneous origin and containing water of hydration and removable alkali compounds until such dissolved lime compounds are abstracted by such material.

3. The process of purifying water from dissolved impurities which comprises filtering such water through a steamed porous amorphous material of igneous origin until such dissolved impurities are abstracted from such water by such material.

4. The process of removing dissolved lime compounds from water which comprises filtering such water through a steamed porous amorphous material of igneous origin until such dissolved lime compounds are abstracted from such water by such material.

5. The process of removing dissolved lime compounds from water which comprises filtering such water through a steamed and alkalinized porous amorphous material of igneous origin until such dissolved lime compounds are abstracted from such water by such material.

6. The process of purifying water from dissolved impurities which comprises filtering such water through a steamed and alkalinized porous amorphous material of igneous origin until such dissolved impurities are abstracted from such water by such material.

7. The process of removing dissolved lime compounds from water which comprises filtering such water through a steamed and alkalinized porous amorphous material of igneous origin which has been treated with a neutral alkali salt, until such dissolved lime compounds are abstracted from such water by such material.

8. The process of purifying water from dissolved impurities which comprises filtering such water through a steamed and alkalinized porous amorphous material of igneous origin which has been treated with a neutral alkali salt, until such dissolved lime compounds are abstracted from such water by such material.

9. The process for the purification of water which comprises filtering it through amorphous pervious hydrated stony material of volcanic origin containing replaceable alkali.

10. In the purification of water by the removal of dissolved impurities therefrom, the process which comprises establishing and maintaining a porous bed of pervious amorphous hydrated mineral material of igneous origin and alternately transmitting water to be purified and chemical reviving solutions through such bed.

11. In the softening and purification of water, the process which comprises establishing and maintaining a porous bed of pervious amorphous hydrated mineral matter of igneous origin and containing sodium and alternately transmitting water to be softened and a solution of sodium chlorid through such bed.

12. The process of softening water which comprises filtering it through a chemically treated hydrated amorphous pervious stony material of volcanic origin containing replaceable alkali.

In testimony whereof, we affix our signatures.

CORNELIUS MASSACIŬ.
AUGUST NEUMANN.